(12) United States Patent
Krowech

(10) Patent No.: US 9,091,349 B2
(45) Date of Patent: Jul. 28, 2015

(54) SELF-ENERGIZING SEAL

(75) Inventor: Robert James Krowech, Eden Prairie, MN (US)

(73) Assignee: HRST, Inc., Eden Prairie, MN (US)

( * ) Notice: Subject to any disclaimer, the term of this patent is extended or adjusted under 35 U.S.C. 154(b) by 0 days.

(21) Appl. No.: 13/569,764

(22) Filed: Aug. 8, 2012

(65) Prior Publication Data

US 2014/0015203 A1    Jan. 16, 2014

Related U.S. Application Data

(60) Provisional application No. 61/669,838, filed on Jul. 10, 2012.

(51) Int. Cl.
| | | |
|---|---|---|
| F16J 15/447 | (2006.01) | |
| F16J 15/16 | (2006.01) | |
| F16J 15/32 | (2006.01) | |
| F16J 15/48 | (2006.01) | |

(52) U.S. Cl.
CPC ............ *F16J 15/164* (2013.01); *F16J 15/3224* (2013.01); *F16J 15/48* (2013.01)

(58) Field of Classification Search
CPC ......... F16J 15/44; F16J 15/441; F16J 15/442; F16J 15/443
USPC .................................. 277/411, 416, 421, 422
See application file for complete search history.

(56) References Cited

U.S. PATENT DOCUMENTS

| | | | |
|---|---|---|---|
| 3,288,472 A | 11/1966 | Watkins | |
| 3,524,653 A | 8/1970 | Vincent | |
| 5,217,237 A | 6/1993 | Westhoff et al. | |
| 5,921,552 A * | 7/1999 | Trackwell et al. | 277/350 |
| 5,955,675 A | 9/1999 | Peterson | |
| 5,984,313 A | 11/1999 | Kraus | |
| 6,030,175 A * | 2/2000 | Bagepalli et al. | 415/173.3 |
| 6,244,599 B1 * | 6/2001 | Braun et al. | 277/352 |
| 6,565,094 B2 * | 5/2003 | Wright et al. | 277/355 |
| 6,572,115 B1 * | 6/2003 | Sarshar et al. | 277/412 |
| 7,188,841 B1 | 3/2007 | Sytsma et al. | |
| 7,237,806 B2 | 7/2007 | Krowech et al. | |
| 7,478,839 B2 | 1/2009 | Barber | |

FOREIGN PATENT DOCUMENTS

WO    2010/075207    7/2010

OTHER PUBLICATIONS

"How compression ring in engine works." https://www.youtube.com/watch?v=tDk1TY-n0fM. Published May 8, 2012.
"Piston rings." http://www.dailymotion.com/video/x6s8ju_piston-rings_auto. Published Sep. 17, 2008.

* cited by examiner

*Primary Examiner* — Gilbert Lee
(74) *Attorney, Agent, or Firm* — Vidas, Arrett & Steinkraus, P.A.

(57) ABSTRACT

A self-energizing seal includes a housing and a plurality of annular seal ring segments movable relative to the housing. The annular seal ring segments include a circumferential slot and a plurality of holes defining a flow passage into the circumferential slot. A plurality of self-energizing ring segments are disposed in the circumferential slot. The annular seal ring segments and the self-energizing ring segments establish a seal with the exterior of a pipe and permit movement of the pipe in a direction orthogonal to the axis of the pipe.

16 Claims, 4 Drawing Sheets

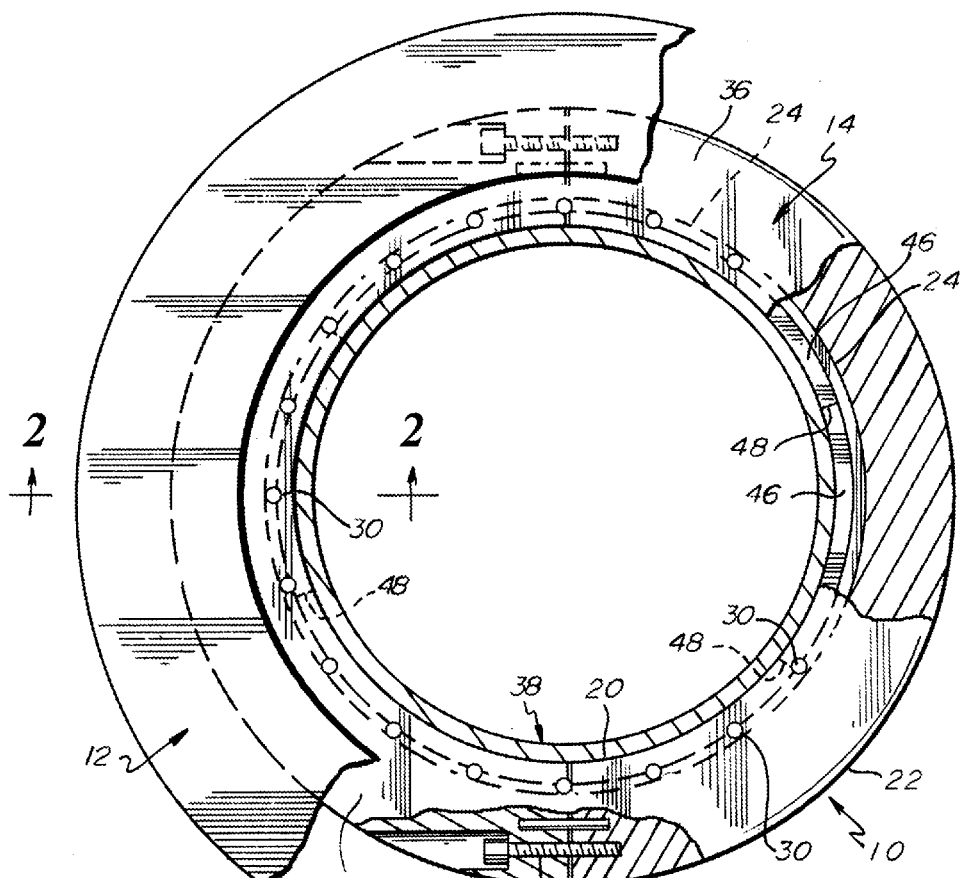
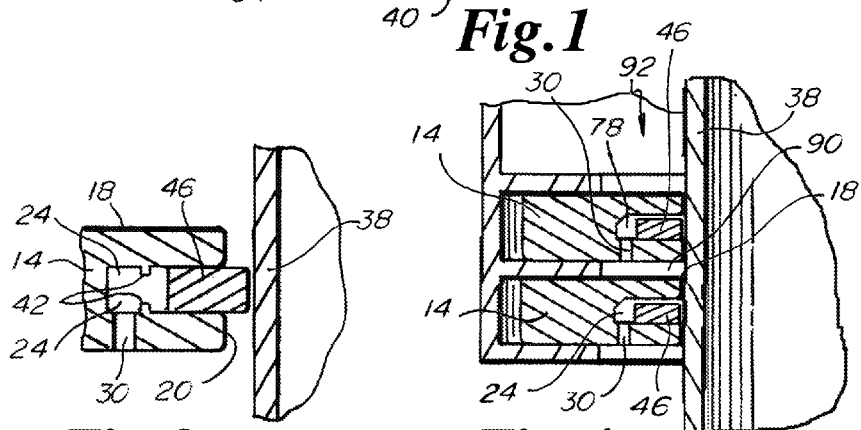
Fig.1
Fig.3
Fig.4

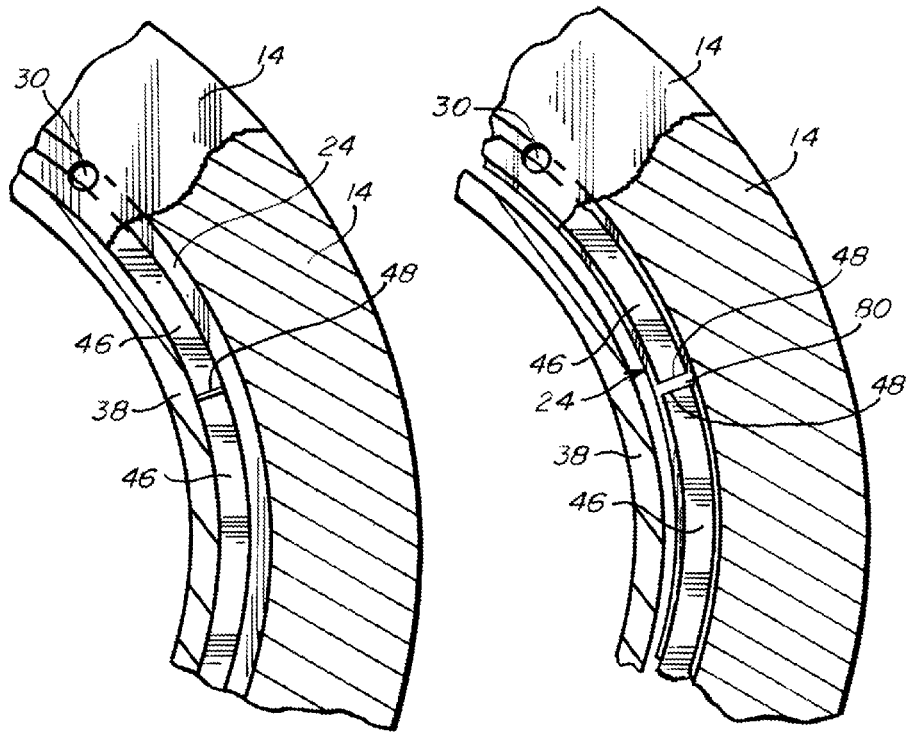
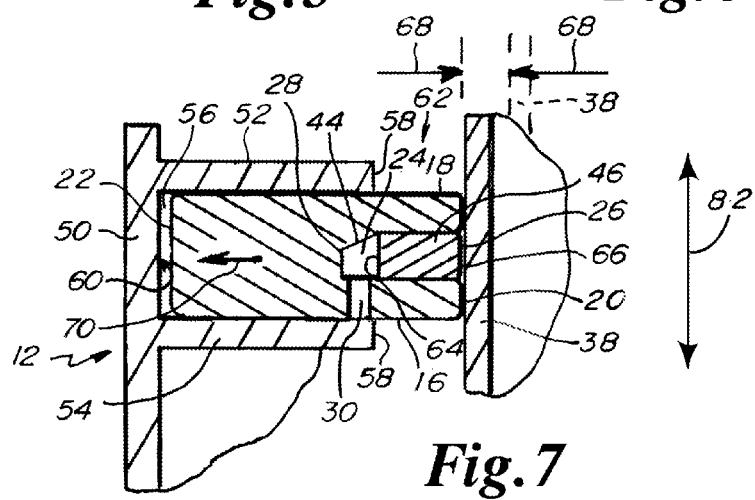

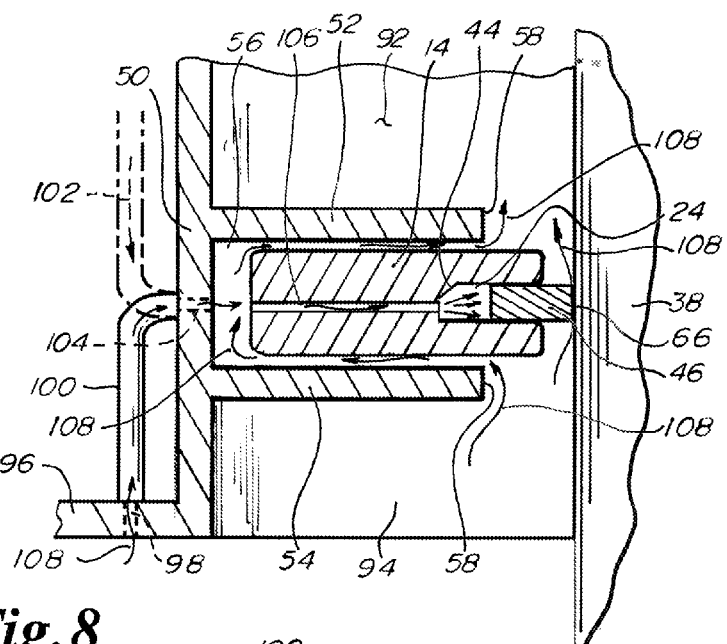
Fig. 8
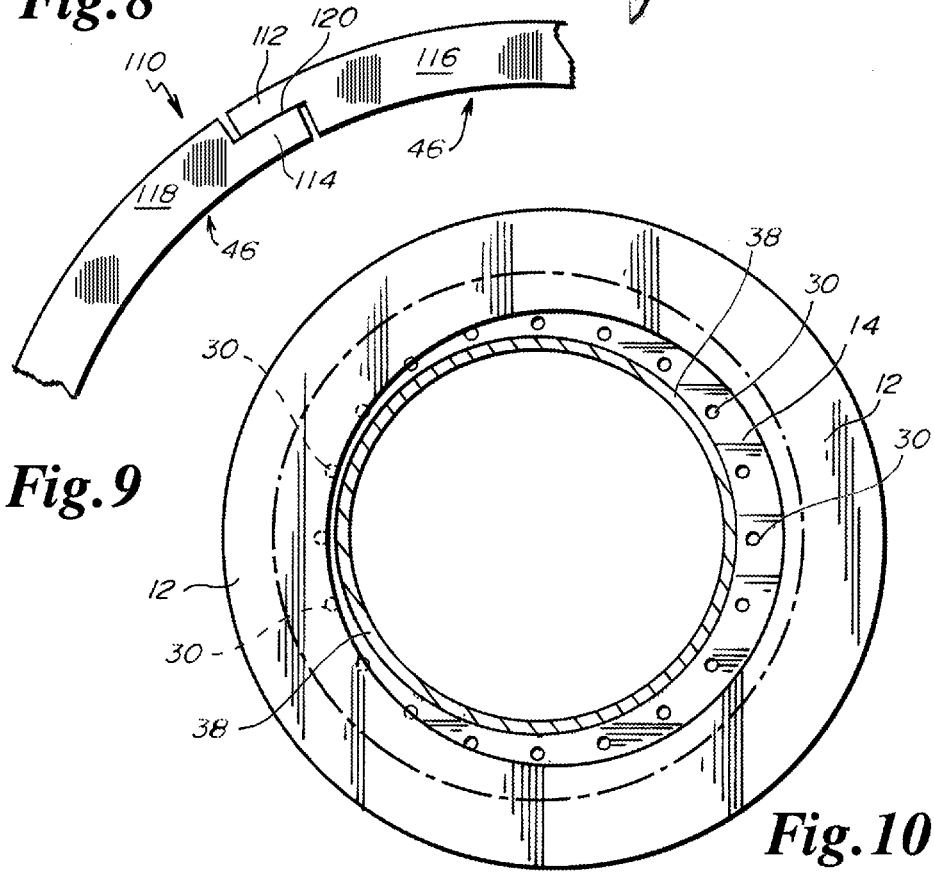
Fig. 9
Fig. 10

SELF-ENERGIZING SEAL

CROSS-REFERENCE TO RELATED APPLICATIONS

This application claims priority to U.S. Provisional Patent Application Ser. No. 61/669,838 entitled Self Energizing Seal as filed Jul. 10, 2012.

BACKGROUND OF THE INVENTION

An expansion joint is an apparatus that is situated between a device such as a boiler and a pipe and allows for expansion and contraction at the joint in order to account for movement of the pipe relative to the device. Expansion joints are used for example at power plants in order to couple boilers to steam pipes that are used to rotate generators. For example, power plants are configured to operate using steam having a temperature up to or exceeding approximately 1200 degrees Fahrenheit and pressure up to or exceeding 2000 PSI. Boiler systems may operate at this temperature, and at high pressure.

Seals are well known in the art for preventing leakage of fluid or contamination from one portion of an assembly to another. Seals can be provided by the use of adhesive sealants and mechanical devices such as gaskets, hermetic seals, labyrinth seals, wiper seals, or adhesive sealants. Depending on the type of seal used and the application, movement of components, high pressures, high temperatures and other environmental conditions may cause significant wear. In some applications, seals may be exposed to sufficiently high pressure or temperature, making use of traditional seals unsuitable. In some applications, a seal may be desired for use around a moving member, and these traditional seals may be too rigid to adequately seal the area while allowing movement of the components.

In the past, pipes, cylinders or rods which penetrate a pressure boundary may require a certain amount of movement relative to the pressure boundary. In these environmental conditions a seal may be used which is formed of a fabric sleeve which is vulnerable to failure in high temperature environments. Alternatively, a metal bellows seal may be utilized which has a limited fatigue life before cracking. Alternatively, a mechanical seal may be utilized which has undesirable tolerances between the seal and the pipe, cylinder, or rod, resulting in substantial leakage. Mechanical seals are subject to tolerance controlled leakage. Mechanical seals may utilize a packing-gasket like material which may experience wear and increase the dimensions for a gap between a pipe and sealing member. In the past, seals which attempt to simultaneously control leakage flow, corrosion, temperature, and gas leakage have experienced marginal reliability.

BRIEF SUMMARY OF THE INVENTION

In one or more embodiments of the invention, a seal is utilized with a pipe which may have translational movement of the pipe orthogonal to the axis of the pipe, axial movement of the pipe, or where the pipe may rotate, said motion of the pipe not adversely affecting the performance of the seal. Seals which continue to function during the movement of a pipe with respect to a device to which the pipe is coupled are not known. It is rare in the mechanical arts to combine flexibility and strength in a seal. In addition, many types of seals have a limited useful life before failing. Maintenance of traditional seals may be a time consuming and expensive endeavor.

In at least one embodiment, the invention relates to a self-energizing seal which includes a housing and a plurality of inelastic annular seal ring segments which are movable within the housing. Each of the annular seal ring segments includes a circumferential slot and a plurality of holes, where the holes define a flow passage with the circumferential slot.

In at least one embodiment the self-energizing seal further includes a plurality of inelastic self-energizing ring segments which are disposed in the circumferential slot. The plurality of self-energizing ring segments are constructed and arranged for translational movement in a direction orthogonal to the axis of a pipe, to engage the exterior surface of a pipe to create a seal, while simultaneously permitting some translational movement of the pipe in a direction orthogonal to the axis of the pipe.

BRIEF DESCRIPTION OF THE SEVERAL VIEWS OF THE DRAWINGS

FIG. 1 is a bottom, partial cutaway, partial phantom line view of an embodiment of the inventive seal.

FIG. 3 is an alternative cross-sectional detail view of one embodiment of the self-energizing ring segments within a floating annular seal ring segment of the inventive seal of FIG. 1.

FIG. 4 is a cross-sectional side view of one embodiment of a system using two of the inventive seals of FIG. 1.

FIG. 5 is a detail partial cutaway bottom view of one embodiment of the inventive seal showing an operational view of the self-energizing ring segments within the circumferential slot.

FIG. 6 is a detail partial cutaway bottom view of one embodiment of the inventive seal showing a retracted position for the self-energizing ring segments within the circumferential slot.

FIG. 7 is a detail cross-sectional side view of one embodiment of the invention taken along the line 2-2 of FIG. 1 showing an alternative position for the elements of the seal.

FIG. 8 is a detail cross-sectional side view of one embodiment of the invention taken along the line 2-2 of FIG. 1, showing an alternative embodiment of the seal.

FIG. 9 is a detail partial top view of an alternative embodiment of the self-energizing ring segments.

FIG. 10 is an alternative bottom, partial phantom line view of an embodiment of the inventive seal and pipe offset from a centered position.

DETAILED DESCRIPTION OF THE INVENTION

Figure 2A:
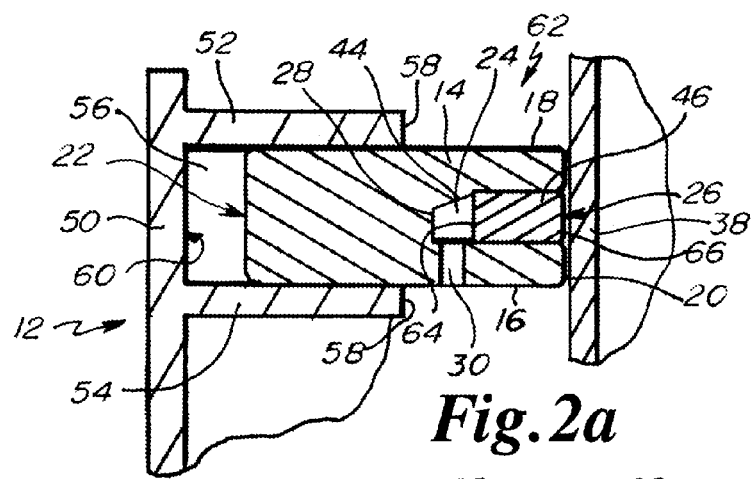
FIG. 2a is a detail cross-section side view of one embodiment of the invention taken along the line 2-2 of FIG. 1 showing one position of the elements of the seal.

While this invention may be embodied in many different forms, there are described in detail herein specific alternative embodiments of the invention. This description is an exemplification of the principles of the invention and is not intended to limit the invention to the particular embodiments illustrated. For the purposes of the disclosure, like reference numerals in the figures shall refer to like features unless otherwise indicated.

In some embodiments a seal 10 is utilized to engage a pipe 38 or cylinder which passes through a pressure boundary. In at least one embodiment the seal 10 is formed of a self-energizing floating seal concept comprising at least one and preferably a plurality of floating annular seal ring segment 14 having a plurality of internal self-energizing ring segments 46, which when exposed to pressure through holes 30, move outwardly from circumferential slot 24, for engagement with the exterior surface of a pipe 38.

In some embodiments the diameter dimension utilized for the pipe 38 may be as small as six inches and as large as eighteen inches or larger. It is anticipated that the seal 10 as described herein may be utilized with either larger or smaller sized pipes or conduits.

In some embodiments (FIGS. 2a, 2b, 2c) the gap 62 between the exterior surface of the pipe 38 and the forward end 58 of the housing 12 may be either increased or decreased in size, dependent on performance and tolerance considerations, and further dependent upon the lateral or other movement of the pipe 38.

FIG. 1 shows an embodiment of a seal generally identified by the numeral 10. Seal 10 includes housing 12 and a split floating annular seal ring, defining floating annular seal ring segments 14. It should be noted that the invention is not restricted to any particular number of floating annular seal ring segments 14, and the number of floating annular seal ring segments 14 may be increased or decreased at the discretion of an individual. Each of the floating annular seal ring segments 14 may include a first annular surface 16, a second annular surface 18 (shown at least in FIG. 2a), an inner surface 20 and an outer surface 22. A circumferential slot 24 (shown in detail at least in FIG. 2a) extends radially from the inner surface 20 into the floating annular seal ring segments 14 along the entire circumference of the inner surface 20. The circumferential slot 24 may have a constant depth, where the direction of the depth is defined between the inner surface 20, towards the outer surface 22. The circumferential slot 24 has a first end 26 at the inner surface 20 and a second end 28. In some embodiments, the circumferential slot 24 has a chamfered edge 44 proximate to the second end 28. Floating annular seal ring segments 14 further comprise a plurality of holes 30 that extend axially from the first annular surface 16 towards the second annular surface 18. In some embodiments, holes 30 have a constant or variable width dimension, depth dimension and/or thickness, wherein the depth dimension extends from the first annular surface 16 towards the second annular surface 18, to create a passageway into the circumferential slot 24. There are no holes 30 through the second annular surface 18; the holes 30 are only present along the first annular surface 16. As shown in at least FIGS. 2a, 2b, and 2c, a hole 30 is aligned with a portion of the circumferential slot 24, and in one embodiment is aligned with the chamfered edge 44, proximate to the second end 28. Thus, a chamber is formed within the floating annular seal ring segments 14 that is defined by the holes 30 and the circumferential slot 24. The chamber extends from the first annular surface 16 to the inner surface 20. Importantly, in some embodiments (as shown in FIG. 1), a floating annular seal ring comprises at least two sections 34 and 36. By having a sectional floating annular seal ring segments 14, the seal 10 may be installed about an existing structure, such as an existing pipe 38 without having to disassemble much (if any) of the structure. The sections 34 and 36 may be joined together by joining means such as welding, soldering, or a fastener assembly 40 as shown in FIG. 1.

One embodiment of the seal 10 is depicted in FIG. 2a. As depicted in FIG. 2a the housing 12 is formed of a rear wall 50, upper support wall 52, and a lower support wall 54. In at least one embodiment, the upper support wall 52 and the lower support wall 54 extend substantially perpendicularly outward from the rear wall 50. The space 56 between the rear wall 50, upper support wall 52, and lower support wall 54 is preferably adapted to receive the floating annular seal ring segments 14 having the outer surface 22 disposed in space 56. The space 56 is preferably sufficiently large to permit the inward or outward repositioning of the floating annular seal ring segments 14 relative to the housing 12. The upper support wall 52 and the lower support wall 54 each include a forward end 58 and the rear wall 50 includes an interior surface 60.

As depicted in FIG. 2a, in at least one embodiment, the housing 12 is sized such that a gap 62 exists between the forward ends 58 of the upper support wall 52 and the lower support wall 54 and the exterior edge of the pipe 38. The floating annular seal ring segments 14, as disposed between the upper support wall 52 and the lower support wall 54, in at least one embodiment, fills the majority of the gap 62 between the housing 12 and the pipe 38. When the pipe 38 is centrally disposed relative to the housing 12, the floating annular seal ring segments 14, are preferably positioned such that the holes 30, and a portion of the first annular surface 16 are exposed to the high pressure and the high temperature portion of a system receiving the seal 10. Within the circumferential slot 24 of the floating annular seal ring segments 14, the self-energizing ring segments 46 are positioned proximate to the exterior edge of the pipe 38. High pressure from the system enters holes 30 and circumferential slot 24 to exert pressure on the self-energizing ring segments 46, for movement of the self-energizing ring segments 46 inwardly against the exterior surface of the pipe 38 to form a seal for the system.

In some embodiments the self-energizing ring segments 46 are formed of an inelastic metallic material which may be stainless steel. In some embodiments pressure on the high-pressure side of the pressure boundary forces the self-energizing ring segments 46 away from the second end 28 of the circumferential slot 24 against a pipe 38 or cylinder, to create a seal to reduce leakage for a system. In at least one embodiment four self-energizing ring segments 46 are utilized within a circumferential slot 24. It should be noted that in other embodiments a larger or smaller number of self-energizing ring segments 46 may be utilized for sealing engagement with respect to the exterior surface of a pipe 38. In some embodiments, the self-energizing ring segments 46 are arcuate in shape, forming a segment of a circle or cylinder. In other embodiments, the self-energizing ring segments 46 may be arcuate, having either identical or different shapes, for sealing with the exterior service of an irregularly shaped pipe 38. In some embodiments the self-energizing ring segments 46 may be as robust as the floating annular seal ring segments 14, and in alternative embodiments the floating annular seal ring segments 14 may be of a more robust construction relative to the self-energizing ring segments 46. The functional interaction between the self-energizing ring segments 46 and the floating annular seal ring segments 14 within the housing 12 enables the translational movement of the self-energizing ring segments 46, floating annular seal ring segments 14, and/or pipe 38 relative to a longitudinal axis of the pipe 38. The direction for the longitudinal axis for the pipe 38 is depicted by reference numeral 82 in FIG. 2b.

In certain embodiments, the floating annular seal ring segments 14 are preferably centrally positioned relative to the pipe 38. In the configuration where the floating annular seal ring segments 14 are centered relevant to the pipe 38, then a gap 62 may exist between the forward ends 58 of the housing 12 and the exterior edge of the pipe 38. The dimensions for the gap 62 may be either increased or decreased in size, dependent on performance and tolerance considerations, and further dependent upon the lateral or other movement anticipated for the pipe 38.

The chamfered edge 44 of the circumferential slot 24 in some embodiments acts as a stop preventing the rearward edge 64 of the self-energizing ring segments 46 from moving away from the pipe 38 for contact with the second end 28. The chamfered edge 44 functions to ensure that a chamber defined by the circumferential slot 24 remains open so that pressure may enter the circumferential slot 24 through at least one, a plurality, or all of the holes 30. Pressure may then be exposed to rearward edge 64 of the self-energizing ring segments 46 for movement in a direction from the floating annular seal ring segments 14 towards pipe 38.

In some embodiments the chamfered edge 44 may be v-shaped or any other shape as desired to limit the movement of the self-energizing ring segments 46 within the circumferential slot 24 away from the pipe 38.

The chamfered edge 44 within the circumferential slot 24 prevents the self-energizing ring segments 46 from seating against the second end 28, which in turn prevents a configuration were pressure through holes 30 would not move the self-energizing ring segments 46 for contact with the exterior surface of pipe 38.

It should be noted that in alternative embodiments the angle for the chamfered edge 44 within the circumferential slot 24 may be varied, however, as the angle selected for the chamfered edge 44 approaches 90° inadequate flow may enter through the holes 30, which in turn may degrade the positioning of the self-energizing ring segments 46 adjacent to a pipe 38.

As depicted in FIG. 2a, in at least one embodiment, the outer surface 22 of the floating annular seal ring segments 14 is separated from the interior surface 60 of the rear wall 50 of the housing 12. In this embodiment, the floating annular seal ring segments 14 extend inwardly from the forward ends 58 of the upper support wall 52 and lower support wall 54 to at least partially fill the gap 62 for positioning proximate to the pipe 38. Any space between the inner surface 20 of the floating annular seal ring segments 14 and the outer surface of the pipe 38 is filled by the engagement surface 66 of the self-energizing ring segments 46, which preferably contact the outer surface of the pipe 38.

Figure 2B:
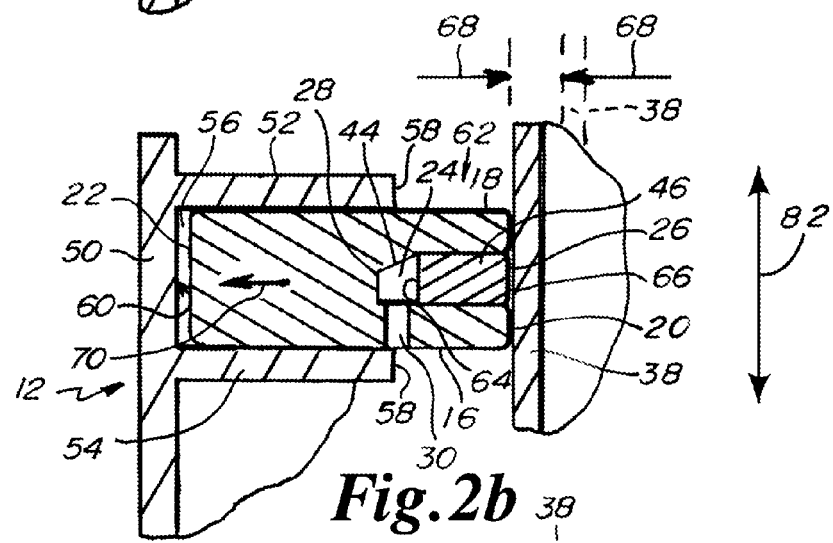
FIG. 2b is a detail cross-section side view of one embodiment of the invention taken along the line 2-2 of FIG. 1 showing an alternative position of the elements of the seal.

As may be seen in FIG. 2b, in least one embodiment, the relative positioning of the pipe 38 has been shifted in a direction of arrow 70 towards housing 12 by a distance dimension represented by arrow 68. In this embodiment the shifting of the pipe 38 towards housing 12 causes the floating annular seal ring segments 14 to move in direction of arrow 70 relative to the upper support wall 52 and the lower support wall 54 to decrease the space 56 between the outer surface 22 of the floating annular seal ring segments 14 and the interior surface 60 of the rear wall 50.

In some embodiments the range of motion for the self-energizing ring segments 46 occurs between a position exterior to the inner surface 20 of the floating annular seal ring segments 14 toward the second end 28 of the circumferential slot 24, to a contact point with the corner of the chamfered edge 44 or stop 42 (FIGS. 2a, 2b, 2c and 3).

Figure 2C:
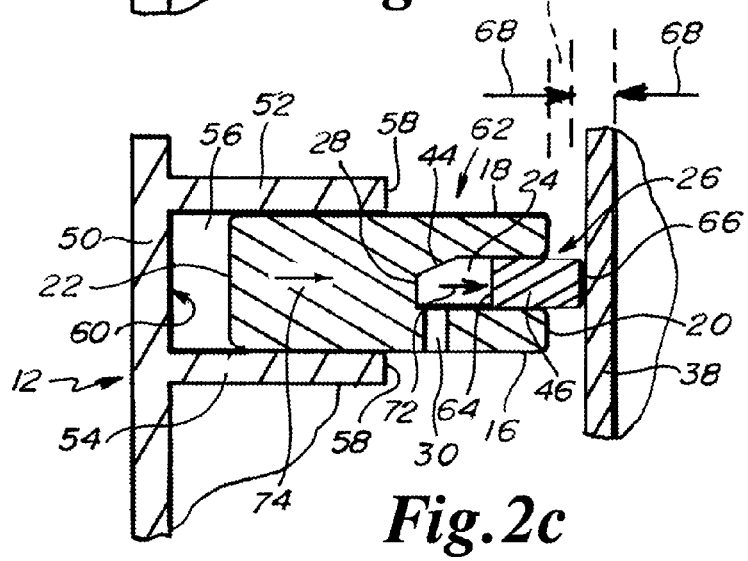
FIG. 2c is a detail cross-section side view of one embodiment of the invention taken along the line 2-2 of FIG. 1 showing another alternative position of the elements of the seal.

As may be seen in at least one embodiment as depicted in FIG. 2c the relative position of pipe 38 is moved in the direction of arrow 74 outwardly relative to housing 12 the distance dimension as depicted by arrow 68. In at least one embodiment as depicted in FIG. 2c the self-energizing ring segments 46 have moved in the direction of arrow 72 extending from the floating annular seal ring segments 14 towards the exterior surface of the pipe 38. In this embodiment, the movement of the self-energizing ring segments 46 toward the exterior surface of the pipe 38 enlarges the chamber within the circumferential slot 24. As depicted in FIG. 2c in at least one embodiment, pressure from the system enters the holes 30 engaging the rearward edge 64 of the self-energizing ring segments 46 for movement of self-energizing ring segments 46 in the direction of arrow 72 for contact with the pipe 38. The contact between the engagement surface 66 of the self-energizing ring segments 46 to the exterior surface of the pipe 38 creates the seal for a system.

In certain embodiments the self-energizing ring segments 46 may be engaged to the exterior surface on one side of the pipe 38 extending from the floating annular seal ring segments 14 as seen in FIG. 2c. The self-energizing ring segments 46 may protrude outwardly from the floating annular seal ring segments 14 by a desired dimension. In alternative embodiments the tolerance between the self-energizing ring segments 46 and the circumferential slot 24 may be increased or decreased dependent upon the applicable system. In at least one embodiment, the diameter for the self-energizing ring segments 46 may be equal to or larger than 0.050 inches in excess of the maximum dimension for the diameter of the pipe 38. In other embodiments, the diameter for the self-energizing ring segments 46 may be increased or decreased relative to the maximum diameter dimension provided for the pipe 38 as desired for a particular application.

In some embodiments as shown in FIG. 3, a plurality of contact members or stops 42 may be disposed within the circumferential slot 24. The contact members or stops 42 in some embodiments function to limit the rearward motion of the self-energizing ring segments 46 towards the second end 28 of the circumferential slot 24.

As may be seen in FIG. 4, in at least one embodiment dual seals may be used within a system. In the embodiment as depicted in FIG. 4, the first seal and the second seal will preferably function as described herein. In the embodiment depicted in FIG. 4, high pressure will enter hole 30 and circumferential slot 24 and pass lower self-energizing ring segment 46 to contact the exterior of pipe 38. Pressure will also leak upwardly past the second annular surface 18 of the floating annular seal ring segments 14 into an intermediate pressure area 90. Pressure from intermediate pressure 90 will then enter hole 30 and circumferential slot 78 of upper seal to actuate self-energizing ring segments 46 inwardly to contact with the exterior surface of pipe 38. Pressure will also leak past the upper self-energizing ring segments 46 toward low pressure area 92. Leakage of pressure past floating annular seal ring segments 14 and self-energizing ring segments 46 is depicted in greater detail in FIG. 8.

In at least one embodiment as depicted in FIG. 5, pressure has entered holes 30 and circumferential slot 24 to actuate adjacent self-energizing ring segments 46 into contact with pipe 38. In this embodiment the proximate edges 48 of the adjacent self-energizing ring segments 46 are in close proximity with each other during the sealing of a system.

In at least one embodiment as depicted in FIG. 6, the seal 10 has not been exposed to pressure and adjacent self-energizing ring segments 46, as disposed in circumferential slot 24, are separated from each other as may be shown by the gap 80 between adjacent proximate edges 48. Once pressure is exposed to seal 10 through holes 30, the adjacent self-energizing ring segments 46 will move inwardly toward pipe 38 for contact with pipe 38 and for positioning of the proximate edges 48 into close proximity to each other (FIG. 5).

In at least one embodiment the circumferential slot 24 is of sufficient size to permit outward movement of the self-energizing ring segments 46 from each other when the self-energizing ring segments 46 are moved in the direction of arrow 70 toward the outer surface 22. In certain embodiments the circumferential slot 24 is sized to permit the inward movement of the self-energizing ring segments 46 for positioning adjacent to, and in sealing engagement in close proximity with each other to reduce leakage flow adjacent to pipe 38.

In some applications, the pipe 38 may move in a direction which is orthogonal to the axis of the pipe 38, such that the housing 12 is off center relative to the pipe 38. In this configuration, one or more holes 30, as located on one side of the housing 12, may be completely or partially obstructed by the lower support wall 54, limiting the pathway for exposure of pressure on the self-energizing ring segments 46 through the circumferential slot 24. It should be noted that in this configuration that the holes 30 on the opposite side of the housing 12, will remain unobstructed and open to exposure to high pressure, permitting high pressure to enter into the circumferential slot 24 to drive the self-energizing ring segments 46 against the exterior of the pipe 38 (FIGS. 7 and 10).

Referring to FIGS. 7 and 10, in at least one embodiment, the pipe 38 has shifted off center in a direction identified by arrow 70 which is orthogonal to the axis of the pipe 38. In this embodiment, the pipe 38 and the floating annular seal ring including the floating annular seal ring segments 14, as well as the self-energizing ring segments 46 have been shifted from a substantially centric position to an eccentric position relative to the center of the housing 12. As may be seen in FIG. 7 the shifting of the pipe 38, floating annular seal ring segments 14 as well as the self-energizing ring segments 46 has caused one or more holes 30 to be positioned outwardly relative to the lower support wall 54 a dimension which is sufficient to cause the holes 30 to be completely or partially obstructed by the lower support wall 54.

In this configuration, holes 30 located on the opposite side of the housing 12 are positioned to the interior of the lower support wall 54, permitting passage of pressure through holes 30 into circumferential slot 24 to actuate self-energizing ring segments 46 inwardly to engage the exterior surface of the pipe 38. In at least one embodiment, even if holes 30 on one side of housing 12 are partially or completely obstructed by the lower support wall 54, pressure will continue to be exposed to the rearward edge 64 of all of the self-energizing ring segments 46 about the circumference of the seal 10, for movement of the self-energizing ring segments 46 into contact with the pipe 38, in order to establish a seal there between. Referring to FIG. 10 the holes 30 which are completely or partially obstructed by the lower support wall 54 are depicted in phantom line.

Referring to FIG. 8, in at least one embodiment, the high-pressure side of the seal 10 is referred to by reference numeral 94, and the low-pressure side of the seal 10 is referred to by reference numeral 92.

In at least one embodiment as depicted in FIG. 8, the seal 10 includes a pressure boundary 96 which is integral to the rear wall 50 of housing 12. The pressure boundary 96 preferably includes a first pressure passage 98. A first conduit 100 is in communication with the first pressure passage 98. The first conduit 100 is also in communication with a second pressure passage 104 through rear wall 50. The first pressure passage 98, first conduit 100 and second pressure passage 104 permit pressure to traverse pressure boundary 96 from high pressure side 94 into space 56 for exposure to floating annular seal ring segments 14 and self-energizing ring segments 46.

In an alternative embodiment, a second conduit 102 may be in flow communication with an external source or device such as a purge air fan to introduce pressure into space 56 through second pressure passage 104. In some embodiments, pressure from the external source or device may be equal to, exceed, or less than 15 "WC." In some embodiments, the pressure in the high pressure side 94 will be equal to, exceed, or be less than 12 "WC."

In at least one embodiment, as depicted in FIG. 8, the floating annular seal ring segments 14 include a third pressure passage 106 which extends substantially horizontally establishing a flow course for pressure from space 56 to circumferential slot 24, which in turn permits pressure to be exposed to the self-energizing ring segments 46 for inward movement against the exterior of a pipe 38. Pressure may enter space 56 by passage through pressure boundary 96, or from an external source or device such as a purge air fan, or from a combination of both pressure sources.

FIG. 8 also depicts a plurality of flow/leakage passages or courses for pressure flow about the floating annular seal ring segments 14 and the self-energizing ring segments 46.

As may be seen in FIG. 8 pressure as depicted by arrows 108 may flow from high pressure area 94 past forward end 58 of lower support wall 54 below floating annular seal ring segments 14 in a direction away from pipe 38 into space 56. The pressure 108 may then flow into third pressure passage 106 for entry into circumferential slot 24 and then passed self-energizing ring segments 46 towards low pressure area 92. Alternatively, and/or simultaneously thereto, pressure 108 may flow from space 56 above floating annular seal ring segments 14, below upper support wall 54 and past forward end 58 into low pressure area 92. Alternatively, or simultaneously therewith, pressure 108 may flow between the engagement surface 66 of the self-energizing ring segments 46 and the exterior surface of the pipe 38 to pass between the high pressure area 94 to the low pressure area 92. Alternatively, and/or simultaneously therewith pressure 108 may initially flow past self-energizing ring segments 46 and floating annular seal ring segments 14 into circumferential slot 24, and may then exit from the circumferential slot 24 above self-energizing ring segments 46 for passage from high pressure area 94 to low pressure area 92.

In another embodiment, pressure 108 may pass from space 56 into third pressure passage 106 and then flow into circumferential slot 24 for further passage above, below, or both above and below self-energizing ring segments 46 towards pipe 38 for passage to low pressure area 92.

In least one embodiment, the pressure passage established by holes 30 may be replaced with the first pressure passage 98, first conduit 100, second pressure passage 104, and third pressure passage 106.

In an alternative embodiment as depicted in FIG. 9, a lap joint 110 may be established between adjacent self-energizing ring segments 46. Each self-energizing ring segments 46 includes a first flange 112 and at the opposite end a second flange 114. As depicted in FIG. 9 a first self-energizing ring segment 116 includes a first flange 112 and a second self-energizing ring segment 118 includes a second flange 114. The use of the lap joint 110 between adjacent self-energizing ring segments 46 establishes a leakage/pressure flow passage including two or more bends each of which may approximate 90° in dimension. In some embodiments, the first self-energizing ring segment 116 and the second self-energizing ring segment 118 may be in contact with each other along flange edge 120, where contact along flange edge 120 reduces pressure flow leakage or passage between adjacent self-energizing ring segments 46, improving the performance of the seal 10.

In certain embodiments, the corners and/or the edges of the forward ends 58, the outer surface 22, the rearward edge 64, the inner surface 20, and/or the corners of the engagement surface 66 may be chamfered and/or rounded to facilitate the slideable positioning of the floating annular seal ring segments 14 relative to the housing 12, and the movement of the self-energizing ring segments 46 within the circumferential slot 24.

In some embodiments the floating annular seal ring segments 14 are formed of a metallic material which may be stainless steel. Preferably the floating annular seal ring segments 14 are inelastic and are comprised of mating sections which may be semi-circular in shape. The floating annular seal ring segments 14 will preferably be of a robust design to accommodate translational movement of the floating annular seal ring segments 14 relative to the housing 12 in a direction orthogonal to the axis of the pipe 38.

In certain embodiments where motion of the pipe 38 is anticipated, then the gap 62 between the floating annular seal ring segments 14 and the exterior edge of the pipe 38 may be increased, or decreased, or the seal 10 may be installed off-center, to compensate for the anticipated repositioning of the floating annular seal ring segments 14, the pipe 38, and/or the self-energizing ring segments 46, during use in the sealing of a system.

In certain embodiments the holes 30 permit pressure to be exerted radially on the self-energizing ring segments 46, as disposed within the circumferential slot 24. In certain embodiments the combined area of the holes 30 is sufficiently larger than the leak area between the self-energizing ring segments 46 and the circumferential slot 24. In certain embodiments the floating annular seal ring segments 14 are constructed to include eight or more holes 30 as desired. It should be noted that a larger or smaller number of holes 30 may be utilized to create passageways through the floating annular seal ring segments 14 into the circumferential slot 24 as desired for a particular application. In certain embodiments the holes 30 are perpendicular to the floating annular seal ring segments 14 and the first annular surface 16. Alternatively, in other embodiments, the holes 30 may be disposed through the first annular surface 16 at an angle to facilitate pressure within the circumferential slot 24.

In some embodiments, the pressure within a boiler may be used to energize the self-energizing ring segments 46 into sealing engagement with the pipe 38, reducing leakage about the seal. The seal 10 in certain embodiments is preferably constructed to withstand steam temperatures in the pipe of up to or exceeding 1200° F. or flue gas temperatures up to and in excess of 1500° F. In certain embodiments, the seal as described herein is constructed for use with HRSG type boilers.

In embodiments where a dual seal may be utilized, the second seal may be provided for sealing efficiency and/or redundancy relative to the first seal. In certain embodiments the self-energizing seal as described herein may be utilized in conjunction with a non-self-energizing seal.

The self-energizing seal may be used in applications where mechanical penetration through a pressure boundary exists and some movement occurs by the penetrating device/structure. The self-energizing seal as identified herein may be used with all types of boilers. In certain embodiments the pressure range on the high-pressure side of the boiler may be 2½ inches WC to 25 inches WC or more. The self-energizing seal as described herein preferably is exposed to adequate pressure to overcome friction between the self-energizing ring segments 46 and the circumferential slot 24.

In some embodiments the seal reduces leakage while providing some rotation of the pipe 38 about the axis of the pipe 38, some movement of the pipe 38 along the axis of the pipe 38, some translational movement of the pipe 38 orthogonal to the axis of the pipe 38, and a limited amount of angular deviation (the amount of angle differing from the axis of the pipe with respect to the device to which it attaches). The extent of translational movement of the pipe 38 orthogonal to the axis of the pipe 38 may be regulated by the size of the spacing between the pipe 38 and the housing 12.

In some embodiments, the space between the inner surface 20 of the housing 12 and the outer surface of the pipe 38 provides the maximum translational movement orthogonal to the axis of the pipe 38, and the spacing may be increased or decreased in dimension depending on the particular environment requirements of the system.

In some embodiments of the invention the floating annular seal ring segments 14 and/or the self-energizing ring segments 46 may be constructed from high strength carbon alloy steel for use in high temperature applications.

In the above description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

While the invention herein disclosed has been described by means of specific embodiments and applications thereof, numerous modifications and variations could be made thereto by those skilled in the art without departing from the scope of the invention set forth in the claims.

The invention claimed is:

1. A self-energizing seal comprising:
  a. a housing comprising a rear wall, an upper support wall and a lower support wall, the upper and lower support walls extending from the rear wall and disposed opposite one another;
  b. a plurality of inelastic annular seal ring segments movably engaged to said housing and disposed at least partially within the housing, each of said annular seal ring segments having a first annular surface facing the upper support wall of the housing and a second annular surface facing the lower support wall of the housing;
  c. each of said annular seal ring segments comprising a circumferential slot, said annular seal ring segments further comprising a plurality of axially extending holes defining a flow passage with said circumferential slot, the axially extending holes defining openings in the first annular surface at one end of the holes, and opening into the circumferential slot at the other end of the holes; and
  d. a plurality of inelastic self-energizing ring segments disposed in said circumferential slot, wherein said plurality of inelastic self-energizing ring segments are constructed and arranged for movement within said circumferential slot.

2. The self-energizing seal of claim 1, wherein said seal is constructed and arranged to engage a pipe, said pipe defining an axis.

3. The self-energizing seal of claim 2, wherein said annular seal ring segments are constructed and arranged for translational movement in said housing orthogonal to said axis.

4. The self-energizing seal of claim 3, wherein said self-energizing ring segments are constructed and arranged for translational movement in said annular seal ring segments orthogonal to said axis.

5. The self-energizing seal of claim 4, wherein said housing is formed of metal.

6. The self-energizing seal of claim 1, comprising two annular seal ring segments.

7. The self-energizing seal of claim 6, comprising four inelastic self-energizing ring segments.

8. The self-energizing seal of claim 1, wherein said annular seal ring segments are formed of metal.

9. The self-energizing seal of claim 1, wherein said annular seal ring segments are formed of stainless steel.

10. The self-energizing seal of claim 1, said circumferential slot comprising a chamfered edge.

11. The self-energizing seal of claim 10, wherein movement of said self-energizing ring segments within said circumferential slot is restricted by said chamfered edge.

12. The self-energizing seal of claim 1, said circumferential slot comprising a stop.

13. The self-energizing seal of claim 12, wherein movement of said self-energizing ring segments within said circumferential slot is restricted by said stop.

14. The self-energizing seal of claim 1, wherein said plurality of annular seal ring segments are releasably engaged to each other.

15. The self-energizing seal of claim 1, wherein said self-energizing ring segments are formed of metal.

16. The self-energizing seal of claim 1, wherein said self-energizing ring segments are formed of stainless steel.

* * * * *